Jan. 17, 1950     W. S. BONNELL     2,494,794
PROCESS OF HYDROCARBON TREATMENT AND REGENERATION
Filed Jan. 5, 1948     2 Sheets-Sheet 2
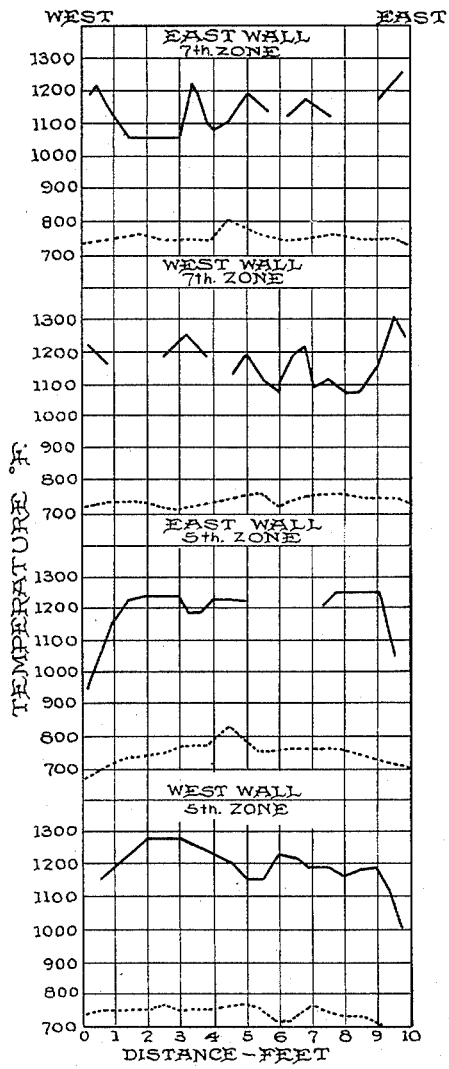
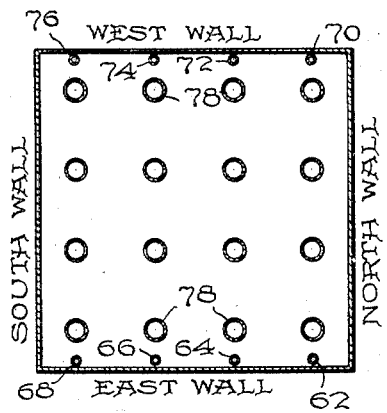
INVENTOR.
WILLIAM S. BONNELL
BY his ATTORNEY Patented Jan. 17, 1950

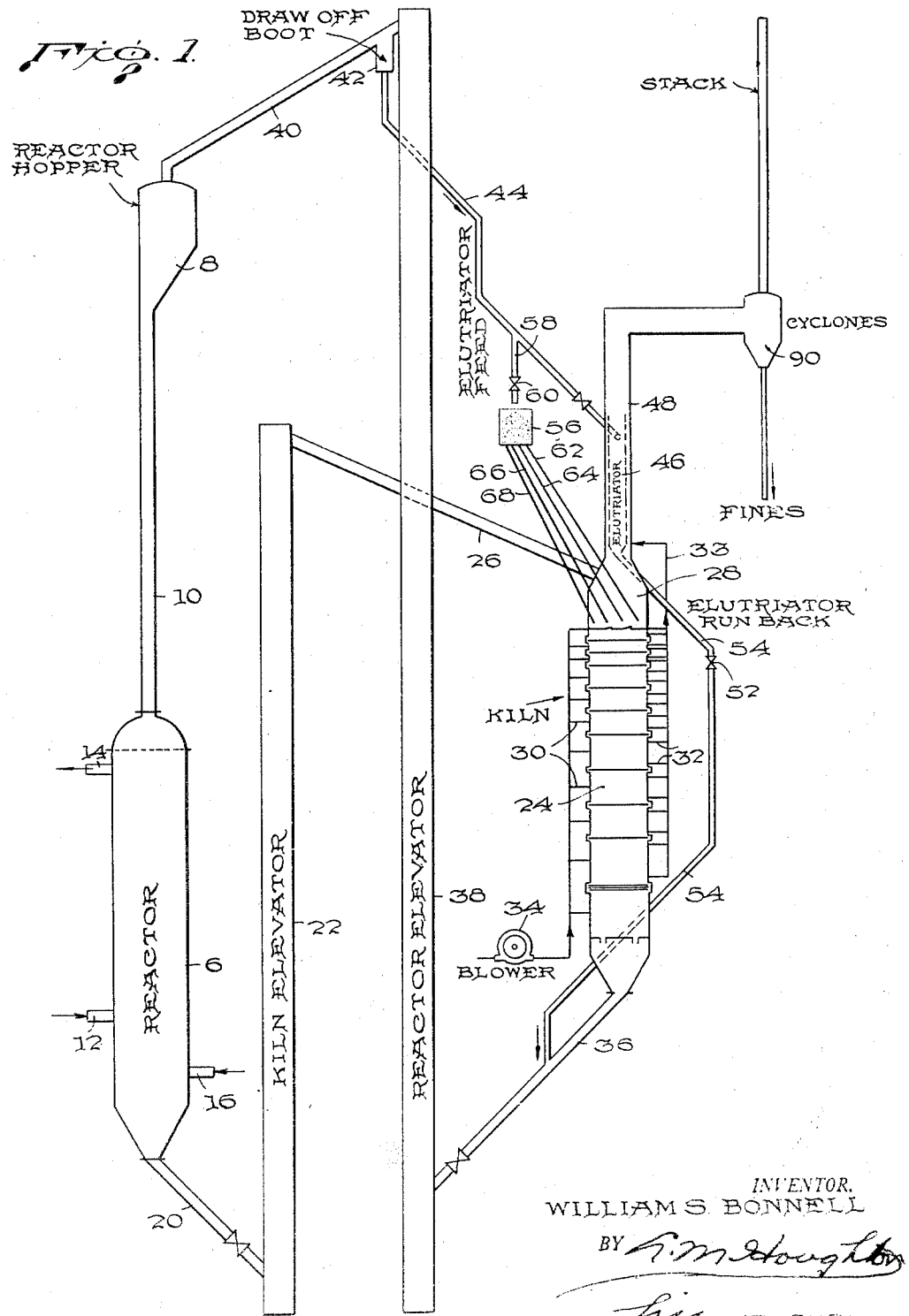

2,494,794

UNITED STATES PATENT OFFICE 2,494,794

PROCESS OF HYDROCARBON TREATMENT AND REGENERATION

William S. Bonnell, Port Arthur, Tex., assignor to Gulf Oil Corporation, Pittsburgh, Pa., a corporation of Pennsylvania Application January 5, 1948, Serial No. 534

4 Claims. (Cl. 196—52)

This invention relates to improved process of the type wherein a catalyst, adsorbent or the like, in pellet form is contacted with a hydrocarbon vapor until it is at least partially deactivated following regeneration to remove carbon by combustion.

It is conventional procedure in catalytic processes such as the cracking of petroleum and petroleum fractions to utilize a catalyst in the form of pellets and to contact the pellets alternately with petroleum vapors to be catalytically converted and with a regenerating gas to remove carbon from the catalyst pellets by combustion. The regeneration is accomplished by introducing the pellets into the top of a kiln through which they flow downwardly as a moving bed while in contact with air or oxygen containing gas which serves to burn off the deposited carbon. The regenerated pellets then are returned to the cracking reactor for reuse. This combustion releases considerable heat and the rate of burning must be controlled. Thus, the amount of air or oxygen delivered to the individual zones of the kiln can be varied and each zone of the kiln is equipped with cooling coils to remove the heat released by the combustion. Excessive temperature damages the kiln internals and rapidly deactivates the catalyst. Thus, it is desirable to limit the maximum regeneration temperature to about 1150° F. However, even with the above means of controlling the rate of burning, when operating with the main portion of the moving catalyst bed at an average temperature of 1050° F., it was found by installing special thermowells near the walls that the two walls of commercial kilns parallel to the cooling coil tubes and air distributors and the catalyst adjacent to these walls operate at temperatures in excess of 1200° F. because of insufficient cooling. The catalyst within one foot of these two walls is from 100° to 400° F. hotter in the upper zones than the catalyst in the main section of the kiln. The flue gas outlet distributors pass through these two walls and tend to lose heat to the walls and the catalyst; furthermore the flue gas outlet headers and ducts reduce the outside wall area through which heat can be dissipated. The other two walls are cooled sufficiently by the air inlet distributors and cooling coils which pass through these walls. Also there is some segregation of catalyst as to particle size where it is dumped into the kiln hopper and downcomers which further complicates maintenance of even temperatures. Because of the nature of the carbon burning reaction and the lack of cooling, the excessive temperature condition rapidly pyramids, the lack of sufficient cooling resulting in high temperatures which speed up the rate of burning and cause still higher temperatures.

It is known that catalysts and especially those of the cracking type become deactivated during use. Excessive temperature will rapidly deactivate a catalyst and the rate at which the deactivation takes place is a function of the time of heating and the temperature. The harmful effect of excessive temperatures on the activity of a natural silica-alumina catalyst is shown in Table I. In this case the catalyst samples were heated in the presence of air alone.

Table I

| Description of Treatment | Untreated | Heat Treated 8 Hrs. at 1100° F. | Heat Treated 4 Hrs. at 1300° F. | Heat Treated 8 Hrs. at 1300° F. | Heat Treated 8 Hrs. at 1500° F. |
|---|---|---|---|---|---|
| Inspection: | | | | | |
| Activity Index— | | | | | |
| CAT-A Method: | | | | | |
| Gasoline, Per Cent by Vol. NLB | 41.6 | 37.8 | 37.0 | 35.4 | 9.29 |
| Gas, Per Cent by Wt | 5.79 | 4.55 | 3.15 | 3.35 | 0.61 |
| Sp. Gravity | 1.45 | 1.39 | 1.29 | 1.26 | 1.07 |
| Coke, Per Cent by Wt | 3.80 | 3.51 | 2.14 | 2.72 | 0.56 |
| Ignition Loss, Per Cent by Wt.: Filtrol Method | 6.40 | 3.52 | 2.95 | 2.38 | 1.39 |
| Attrition Loss, Per Cent by Wt | 25.0 | 13.65 | 15.7 | 12.5 | 15.6 |
| Hardness Index, Per Cent by Wt | 75.0 | 86.35 | 84.3 | 87.5 | 84.4 |
| Apparent Density, G./Cc | 0.68 | 0.70 | 0.72 | 0.72 | 1.06 |
| Sieve Analysis, Per Cent by Wt.: | | | | | |
| Secony-Vacuum Method— | | | | | |
| On 3 | none | | | | |
| Thru 3, on 4 | 43.0 | | | | |
| Thru 4, on 5 | 54.9 | | | | |
| Thru 5, on 6 | 1.9 | | | | |
| Thru 6, on 7 | 0.1 | | | | |
| Thru 7, on 8 | none | | | | |
| Thru 8, on 10 | none | | | | |
| Thru 10 | 0.1 | | | | |

It has been further observed that the rate of deactivation is even more severe when the catalyst is overheated in the presence of steam. In Table II the activities of samples of the same natural silica-alumina catalyst are shown after heating at the temperatures indicated in an atmosphere of steam.

*Table II*

|  | Fresh | Steam—4 Hours—Atmospheric Pressure | | |
|---|---|---|---|---|
|  |  | 1150° F. | 1250° F. | 1350° F. |
| Activity Index: |  |  |  |  |
| Gasoline | 40.7 | 36.0 | 35.5 | 29.3 |
| Coke, Wt., Percent | 3.68 | 2.75 | 2.43 | 1.70 |
| Gas, Wt., Percent | 7.44 | 4.04 | 4.57 | 2.94 |

In commercial operation some steam is present in the regeneration kiln due to moisture in the air, presence of combined hydrogen in the coke deposit on the catalyst, process steam adsorbed by the catalyst in the reactor, and burning of natural gas in an airline burner to preheat the air for regeneration. I have made measurements in the regenerating kilns of commercial cracking units in which catalyst temperatures as high as 1500° F. were obtained in the area adjacent to the two hot walls, even though the main portion of the catalyst was controlled for a maximum temperature of 1150° F. It is therefore apparent that the hot wall condition results in excessive temperatures which are a major factor in loss of catalyst activity.

"Activity index" as used herein is the cracking activity as determined by "Catalyst activity tests—A (Catalogue A)" published by the Catalytic Development Corp., Houdry Process Corp. and Socony-Vacuum Oil Co.

This invention has for its object to provide improved catalytic, adsorption, etc., process. Another object is to provide improved hydrocarbon cracking process whereby the foregoing difficulties can be overcome. Another object is to provide procedure whereby catalyst pellets can be used to control temperatures in a regenerating kiln. A still further object is to provide a process for the continuous catalytic conversion of hydrocarbon oils whereby catalyst pellets can be continuously utilized to control the temperature of specific sections of the kiln such as areas adjacent to the kiln walls. Other objects will appear hereinafter.

These and other objects are accomplished by my invention which includes the step of introducing a contact agent such as an adsorbent or catalyst in pellet form, which is substantially free of carbon, into that portion of the kiln which tends to become overheated. It has been found that these pellets, which are substantially free of carbon, flow downwardly through the portion of the kiln which tends to become overheated and because of the substantial absence of combustible material thereon, result in a reduction in temperature in that portion of the regenerator.

In the following examples and description I have given several of the preferred embodiments of my invention, but it is to be understood that they are set forth for the purpose of illustration and not in limitation thereof.

Referring to the drawings:

Figure 1 is a diagrammatical elevation of a continuous hydrocarbon catalytic cracking apparatus provided with means for delivering catalyst pellets which are substantially free of carbon, such as regenerated catalyst pellets, to overheating sections of the regenerating kiln;

Figure 2 is a fragmentary enlarged view of the top portion of the regenerating kiln shown in Figure 1;

Figure 3 is a horizontal section of the kiln taken on line 3—3 of Figure 2; and

Figure 4 is a comparison of temperature readings made at appropriate points near the kiln walls of a commercial cracking unit, similar to that shown in Figs. 1–3, when operating with and without recirculation of regenerated catalyst.

Referring to Figures 1, 2 and 3, numeral 6 designates a continuous reactor for contacting hydrocarbon vapors or mixed hydrocarbon liquid-vapors with cracking catalyst pellets such as silica-alumina pellets, which are preferably about the size of a small pea. The catalyst pellets are continuously introduced into the reactor 6 from hopper 8 by way of delivery conduit 10. Numeral 12 designates a conduit for introducing the hydrocarbon vapors into the reactor while conduit 14 is provided for removing cracked hydrocarbon vapors from the reactor. With this arrangement the flow is countercurrent. It is also common practice to operate with concurrent flow; i. e., the hydrocarbon vapors are introduced through conduit 14 and removed through conduit 12. After passage through the reactor the catalyst pellets are steamed to remove hydrocarbon vapors by steam introduced through conduit 16. After the steaming operation the catalyst pellets flow through delivery tube 20 into elevator mechanism 22 and are delivered thence into kiln 24 by way of tube 26. This kiln is of conventional construction, having a rectangular cross section and consisting of a number of zones equipped with means for distributing air and collecting flue gas in each zone. Also each zone contains cooling coils for removing heat released by combustion. The catalyst pellets are continuously introduced from kiln hopper 28 into the kiln 24 where the carbon deposited thereon is burned off at elevated temperature with air introduced into the sections of the kiln through conduits 30 by blower 34. Combustion or flue gases pass from the sections of the kiln through conduits 32 and these gases are delivered to the elutriator and stack by way of conduit 33. This combustion is conducted in known manner to remove most of the carbon deposited on the catalyst pellets. The catalyst pellets flow downward by gravity through the sections of the kiln and thence through conduit 36 into the intake of elevator 38 which elevates the regenerated pellets and returns them by way of tube 40 to the reactor hopper 8 for reuse.

It is customary in such a catalytic process to continuously remove undersized particles by elutriation. This is accomplished in the apparatus illustrated by drawing off part of the regenerated catalyst from the draw off boot 42 positioned at the discharge of elevator 38. This withdrawn catalyst flows through conduit 44 into elutriator 46 positioned in kiln flue 48. In the elutriator the catalyst granules are continuously brought into contact with a rapidly moving stream of flue gas introduced through conduit 33. The stream of gas carries or sweeps with it any small or undersized particles of catalyst which particles are separated in cyclone 90 in known manner. The catalyst pellets then pass from the elutriator through conduit 54 and valve 52 back into the main stream of catalyst pellets in conduit 36 as indicated.

Numeral 56 designates a distributing pot into which catalyst pellets flow from conduit 58 at a rate controlled by valve 60. Numerals 62 to 68 and 70 to 76 designate conduits for supplying catalyst from pot 56 to sections of the kiln 24 which becomed overheated. For convenience it will be assumed that the east and west walls become overheated for the reasons pointed out above. Conduits 62 to 68 are therefore shown as delivering catalyst to the east wall and conduits 70, 72, 74 and 76 as delivering catalyst to the west wall. Numeral 78 designates a plurality of short or truncated conduits integral with the plate 80 of kiln hopper 28. These conduits are positioned as indicated so as to deliver catalyst pellets from hopper 28 into the kiln 24 in an evenly distributed manner. The lower ends of conduits 62, 64, 66 and 68 are positioned so that they discharge the catalyst into the area between conduits 78 and the east wall of kiln 24. Corresponding conduits 70, 72, 74 and 76 (see Fig. 3) are positioned so as to introduce catalyst from distributing hopper 56 against the west wall of the kiln. All of these conduits 62–68 and 70 to 76 are provided with suitable flow controlling devices such as orifices 84.

Referring particularly to Figs. 2 and 3, it will be noted that each conduit 62 to 76 is positioned between a hot wall and a downcomer 78. The catalyst flows in a pile from each downcomer as indicated by the dotted line 86. Therefore the catalyst level at the walls of the kiln is lower than at the downcomers and the catalyst profile along the wall varies in a regular pattern, being highest at the downcomer centerline and lowest midway between the downcomers. Because of this characteristic flow pattern I have been able to distribute the regenerated catalyst evenly across the wall by using a distributor pipe for each downcomer along the face of the hot walls. Uniformity of the temperature across the hot wall is obtained by this even distribution of regenerated catalyst.

In operating the apparatus illustrated in Figs. 1, 2 and 3, hydrocarbon oil vapors are introduced into the reactor 6 through conduit 12 and catalyst pellets are introduced into the reactor 6 from hopper 8 by way of conduit 10. Cracked hydrocarbon vapors are removed through conduit 14, and steam is introduced through conduit 16. The catalyst pellets pass downwardly by gravity as a moving bed through the reactor 6 and when they reach the lower portion thereof they are stripped of hydrocarbons by the stripping steam. The catalyst pellets then pass by gravity through conduit 20 into the base of elevator 22, are elevated and pass from the top of the elevator through conduit 26 into the kiln hopper 28 at the top of kiln 24. This catalyst then passes through the downcomer conduits 78 into the kiln where they are contacted with air at elevated temperature so as to burn off the deposited carbon. The catalyst pellets pass as a moving bed downwardly through the several zones of the kiln and finally pass into the conduit 36 at the base of the kiln, thence into elevator 38, conduit 40 and back to the reactor hopper 8. Part of the regenerated catalyst is withdrawn through boot 42, conduit 44, and is separated from fines in elutriator 46 and is returned to the base of elevator 38 by way of conduits 54 and 36.

Part of the catalyst from elutriator feed conduit 44 passes through conduit 58 and valve 60 into the distributor pot 56. This catalyst then flows through conduits 62—66 and 70—76 and is distributed against the east and west walls of the kiln as shown in detail in Figures 2 and 3. Pot 56 is run full of catalyst to evenly fill the distributing conduits which also run full and thus prevent leakage of flue gases through this part of the system. Orifices 84 in these conduits are of such size as to permit the flow of the desired amount of catalyst to control the temperature in the overheating zones. This regenerated catalyst then flows downwardly by gravity against the east and west walls of the kiln and finally flows into conduit 36 with the rest of the catalyst which has been regenerated.

*Example*

A commercial unit similar to that illustrated in Figures 1 to 3 utilizing a natural silica-alumina catalyst to crack heavy gas oil was operated with a total of nine tons per hour of regenerated catalyst circulated to the east and west walls of the regenerator kiln through four conduits positioned near each of these walls. The regenerated catalyst was distributed evenly against the east and west walls of the kiln in order to eliminate a hot wall condition which would otherwise have existed due to insufficient cooling as previously explained. The temperatures of these two walls at two of the zones near the top of the kiln before circulating the regenerated catalyst thereto (solid lines) and after circulating regenerated catalyst (dotted lines) are shown in Figure 4. It will be noted that the temperature of the hot east and west walls was reduced from about 1100° to 1400° F. to 700° to 800° F. and that the temperature was made more uniform as evidenced by the relative lack of peaks in the dotted curves. The uniformity of the temperatures across the walls is due to good distribution of the regenerated catalyst along the wall, as is explained in detail above. Since the regenerated catalyst contained only about 0.1 per cent by weight of carbon as compared with about 2 per cent by weight for the catalyst undergoing regeneration it is apparent that the reduction in temperature resulted from a decrease in the amount of carbon burned in these areas. This system has been in continuous operation and has permitted maintaining the system catalyst above 30 activity index with less than 3 T/D fresh catalyst makeup. Prior to installation of this system the catalyst activity could not be maintained above 25 with more than 3 T/D fresh catalyst makeup. The temperature surveys and catalyst activity experience to date indicate that it may be possible to reduce the regenerated catalyst recirculation several tons per hour without encountering excessive temperatures and catalyst deactivation at the walls. In this example the total circulation of catalyst in the system was 100 tons/hour and a total of 3500 lbs./hour of carbon was being burned in the kiln.

While I have found it convenient to describe my invention in connection with a hydrocarbon cracking process utilizing a silica-alumina cracking catalyst it is to be understood that it is applicable to any regenerating process in which a contact agent or catalyst in pellet form is passed as a moving bed through a regenerator kiln where carbon is removed from the pellets by combustion, and to any contact agent or catalyst which becomes deactivated by heating to the excessive temperatures which are frequently encountered during such regeneration. Thus the process of my invention is applicable to other cracking catalysts such as silica-magnesia, zirconia-silica, titania-silica and alumina-zirconia-silica catalysts. It is also applicable to easily reducible metal oxides such as oxides of nickel, cobalt and iron and to difficultly reducible oxides such as oxides of chromium, molybdenum and tungsten, all of which are generally used on porous carriers such as alumina and/or silica. These catalysts may be used for hydrogenation, dehydrogenation, desulfurization, aromatization, etc. My invention also can be employed in the regeneration of contact agents used for non-catalytic purposes such as adsorption. For instance my invention can be utilized to regenerate fuller's earth or buxite pellets after they have been used to decolorize lubricating oils.

Many catalytic operations are conducted in reactors of the fixed bed type; i. e. the catalyst is maintained in a stationary position during the period of time used for conversion of the reactants. At intervals, the catalyst is removed from the reactor and regenerated by circulation through a kiln similar to that previously described. It is to be understood that my invention can be used to regenerate catalysts which have become deactivated in such fixed bed processes.

While I prefer to circulate regenerated catalyst to the areas which overheat, it is obvious that fresh catalyst which must be introduced into the system to replace catalyst lost by attrition or for any other purpose can also be used to replace part or all of the regenerated catalyst. Also the regenerated catalyst distributing conduits can be varied in size, number and location so as to deliver the necessary amount of regenerated catalyst with the proper distribution to any location which tends to overheat.

It is known to introduce elutriated and regenerated catalyst into the center of the kiln. However this is done merely as a convenient method of returning the catalyst to the system and is not for the purpose of controlling overheating zones. Because of the conventional cooling coils the center of the kiln does not overheat.

It is evident from the foregoing that my invention provides a positive method for controlling the temperature of local areas in a regenerating kiln of the moving bed type. It also follows that my invention greatly prolongs the useful life of a catalyst by avoiding overheating and consequent deactivation. The installation cost is low since only piping is required and the control of the flow of regenerated catalyst can be varied easily by changing orifices which can be done while the system is in operation. Recirculating the regenerated catalyst through the kiln does not decrease carbon burning capacity. Actually, with the hot wall condition controlled, the carbon load can be increased.

What I claim is:

1. In the process of cracking a hydrocarbon oil by contacting vapors thereof with heated catalyst pellets moving downwardly by gravity through a reactor followed by regeneration of the catalyst pellets by introducing them into the top of an approximately vertical regenerator through which they pass downwardly by gravity while at elevated temperature and while in contact with oxygen containing gas, the improvement which comprises introducing previously regenerated catalyst pellets into the regenerator against the top of a wall of the regenerator which during regeneration becomes overheated whereby the regenerated catalyst pellets flow downwardly along the wall of the regenerator which tends to become overheated and due to the lack of combustible material thereon cause a reduction in the temperature of the regenerator wall.

2. In the process of cracking a hydrocarbon oil by contacting vapors thereof with heated catalyst pellets moving downwardly by gravity through a reactor followed by regeneration of the catalyst pellets by introducing them into the top of an approximately vertical regenerator through which they pass downwardly by gravity while at elevated temperature and while in contact with oxygen containing gas, the improvement which comprises introducing previously regenerated catalyst pellets into the regenerator against the top of the wall of the regenerator through which flue gases are removed and which during regeneration become overheated whereby the regenerated catalyst pellets flow downwardly along said wall and due to the lack of combustible material thereon cause a reduction in the temperature of said regenerator wall.

3. In the process of cracking a hydrocarbon oil by contacting vapors thereof with heated silica-alumina cracking catalyst pellets moving downwardly by gravity through a reactor followed by regeneration of the catalyst pellets by introducing them into the top of an approximately vertical regenerator through which they pass downwardly by gravity while at elevated temperature and while in contact with oxygen containing gas, the improvement which comprises introducing previously regenerated catalyst pellets into the regenerator against the top of a wall of the regenerator which during regeneration becomes overheated whereby the regenerated catalyst pellets flow downwardly along the wall of the regenerator which tends to become overheated and due to the lack of combustible material thereon cause a reduction in the temperature of the regenerator wall.

4. The process of regenerating catalyst pellets which are contaminated with carbon as a result of use in a hydrocarbon cracking process which comprises allowing said contaminated catalyst pellets to descend by gravity through a regenerating chamber in the presence of oxygen at combustion temperature and simultaneously introducing into said regenerating chamber in contact with at least one of the interior walls thereof, a second portion of catalyst which contains a substantially lesser quantity of carbon than the catalyst to be regenerated, whereby this catalyst of lesser carbon content flows downwardly along the interior wall and prevents the combustion temperature near the wall of the regenerating chamber from reaching a degree sufficient to overheat the wall, and preventing intermingling of the second portion of catalyst which is introduced against the interior wall with the catalyst to be regenerated to an extent sufficient to maintain a lower temperature along the wall than in the catalyst to be regenerated.

WILLIAM S. BONNELL.

REFERENCES CITED

The following references are of record in the file of this patent:

UNITED STATES PATENTS

| Number | Name | Date |
| --- | --- | --- |
| 2,395,106 | Day et al. | Feb. 19, 1946 |
| 2,416,214 | Payne | Feb. 18, 1947 |
| 2,423,813 | Lechthaler et al. | July 8, 1947 |
| 2,458,350 | Crowley, Jr. | Jan. 4, 1949 |